(12) United States Patent
Jeon et al.

(10) Patent No.: US 8,817,084 B2
(45) Date of Patent: Aug. 26, 2014

(54) DISPLAY DEVICE

(75) Inventors: Byoung Kun Jeon, Daejeon (KR); Suyoung Ryu, Daejeon (KR); Moon Soo Park, Daejeon (KR); Sin Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 352 days.

(21) Appl. No.: 13/427,466

(22) Filed: Mar. 22, 2012

(65) Prior Publication Data

US 2012/0262449 A1  Oct. 18, 2012

(30) Foreign Application Priority Data

Mar. 23, 2011 (KR) .................. 10-2011-0025993
Mar. 21, 2012 (KR) .................. 10-2012-0028936

(51) Int. Cl.
*H04N 13/04* (2006.01)
*G02B 27/26* (2006.01)
*G02B 27/22* (2006.01)

(52) U.S. Cl.
CPC ............ *H04N 13/0434* (2013.01); *G02B 27/26* (2013.01); *G02B 27/225* (2013.01)
USPC ................................ 348/58; 348/51; 345/419

(58) Field of Classification Search
None
See application file for complete search history.

(56) References Cited

U.S. PATENT DOCUMENTS

2006/0209407 A1* 9/2006 Hamagishi .................... 359/465

* cited by examiner

*Primary Examiner* — Sath V Perungavoor
*Assistant Examiner* — Dakshesh Parikh
(74) *Attorney, Agent, or Firm* — McKenna Long & Aldridge, LLP

(57) ABSTRACT

This application relates to a display device and a method for preparing a display device. According to one illustrative display device or method for preparing a display device, for example, a stereoscopic image may be displayed in wide viewing angles without losses of the brightness.

18 Claims, 14 Drawing Sheets

Fig. 3

| LS | RS | LS | RS | LS | RS | LS |
|----|----|----|----|----|----|----|
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |
| LS | RS | LS | RS | LS | RS | LS |
| RS | LS | RS | LS | RS | LS | RS |

Fig. 6

| LG |
|---|
| RG |
| LG |
| RG |
| LG |
| RG |

Fig. 7

| LG | RG | LG | RG | LG | RG | LG |
|----|----|----|----|----|----|----|
| RG | LG | RG | LG | RG | LG | RG |
| LG | RG | LG | RG | LG | RG | LG |
| RG | LG | RG | LG | RG | LG | RG |
| LG | RG | LG | RG | LG | RG | LG |
| RG | LG | RG | LG | RG | LG | RG |
| LG | RG | LG | RG | LG | RG | LG |
| RG | LG | RG | LG | RG | LG | RG |

DISPLAY DEVICE

CROSS-REFERENCE TO RELATED APPLICATION

This application is a Utility Application that claims the benefit of Korean Application Nos. 10-2011-0025993, filed on Mar. 23, 2011, and 10-2012-0028936, filed on Mar. 21, 2012, which are hereby incorporated by reference for all purposes as if full set forth herein.

BACKGROUND

1. Field of the Invention

This application relates to a display device and a method for preparing a display device.

2. Discussion of Related Art

A stereoscopic image display device is a display device capable of transferring three dimensional information to an observer.

Methods for displaying stereoscopic images may include, for example, methods that use glasses and methods that don't use glasses. Also, the methods using glasses may be classified into methods using polarizing glasses and methods using LC shutter glasses, and the methods that don't use glasses may be classified into stereoscopic/multi-view point binocular disparity methods, volumetric methods, holographic methods, and the like.

SUMMARY

This application provides a display device and a method for preparing a display device.

A display device according to one embodiment may include a displaying part and a filtering part. In one embodiment, the display device may be a stereoscopic image display device (hereinafter, referred to as "3D device"). In one embodiment of the device, the displaying part and the filtering part may be positioned so that signals emitted from the displaying part may penetrate the filtering part and then transferred toward an observer.

The displaying part may include a region (hereinafter, referred to as "RS region") for generating a signal for a right eye, configured to generate the signal (hereinafter, referred to as "R signal") for the right eye in a driving state, and a region (hereinafter, referred to as "LS region") for generating a signal for a left eye, configured to generate the signal (hereinafter, referred to as "L signal") for the left eye in a driving state. The term "driving state" as used herein may refer to a state where the display device such as the 3D device displays images such as stereoscopic images.

The displaying device may further include a light-penetration-controlling region (hereinafter, referred to as "TC region"), which is adjacent to the RS and LS regions.

The term "TC region" as used herein may refer to a region that is formed so as to be capable of blocking lights entering into the region or allow only a part of lights entering into the region to go through the region. In one embodiment, the TC region may be a region of which the transmittance of lights entering into the region, i.e., the light transmittance is in the range from 0% to 20%, from 0% to 15%, from 0% to 10% or from 0% to 5%.

Also, the term "TC region being adjacent to the RS and LS regions" as used herein may refer to the TC region being positioned so that, in case where images are observed in at least one angle falling within the ranges of the viewing angles, at least a part of the R signal and/or L signal may enter into the TC region in the process that the R signal and/or L signal generated from the RS region and/or LS region is transferred toward the filtering part, and thereby the incident signal may be blocked by the TC region or only a part of the incident signal may go through the TC region, and then be transferred to the filtering part.

The term "viewing angles" as used herein may refer to the ranges of the angles, within which the L signal generated from the LS region may go through a region (hereinafter, referred to as "LG region") for controlling the polarization state of the L signal and may not go through a region (hereinafter, referred to as "RG region") for controlling the polarization state of the R signal, and then be transferred toward an observer, or within which the R signal generated from the RS region may go through the RG region and may not go through the LG region, and then be transferred toward an observer. At an angle exceeding the viewing angles, the L signal goes through the RG region, and then is transferred to an observer, or the R signal goes through the LG region, and then is transferred to an observer, and therefore a so-called crosstalk which lowers the quality of the image may occur.

In one embodiment, the TC region that is presented adjacent to the RS and LS regions may be between the RS and LS regions. Examples of the case where the TC region is between the RS and LS regions may include the case where the RS, TC and LS regions are sequentially positioned on the same plane, or the case where the TC region is positioned on the front or the back side of the plane, on which the RS and LS regions are positioned. In case where the TC region is positioned on the front or the back side of the plane, on which the RS and LS regions are positioned, the TC region may be presented so as to be overlapped with at least a part of the RS and/or LS region when the front side of the device is observed.

The filtering part may include a polarization state-controlling region and a TC region. In this specification, for convenience sake, the TC region included in the displaying part is referred to as "TC1 region," and the TC region included in the filtering part is referred to as "TC2 region." The polarization state-controlling region may include RG and LG regions. In one embodiment, the RG region may be, for example, in a position into which the R signal generated in the displaying part may enter in a driving state. Also, the LG region may be, for example, in a position into which the L signal generated in the displaying part may enter in a driving state.

The TC2 region may be positioned to be adjacent to the RG and LG regions. The term "TC2 region being adjacent to the RG and LG regions" as used herein may refer to the TC2 region being positioned so that, in case where images are observed in at least one angle falling within the ranges of the viewing angles, a part of the R signal and/or L signal may enter into the TC2 region before the R signal and/or L signal transferred from the displaying part enters into the RG region and/or LG region, in the process that the R signal and/or L signal transferred from the displaying part penetrates the RG and/or LG region, or after the R signal and/or L signal transferred from the displaying part penetrates the RG and/or LG region, and thereby the incident signal may be blocked by the TC2 region or only a part of the signal entering into the TC2 region may go through the TC2 region.

In one embodiment, the TC2 region that is presented to be adjacent to the RG and LG regions may be between the RG and LG regions. Examples of the case where the TC2 region is between the RG and LG regions may include the case where the RG, TC2 and LG regions are sequentially positioned on the same plane, or the case where the TC2 region is positioned on the front or the back side of the plane, on which the RG and LG regions are positioned. In case where the TC2 region is positioned on the front or the back side of the plane, on which the RG and LG regions are positioned, the TC2 region may be positioned so as to be overlapped with at least a part of the RG and/or LG region when the front side of the device is observed.

A 3D device according to one embodiment may be a device, the image generated from which may be observed by an observer wearing glasses (hereinafter, referred to as "3D glasses") for observing stereoscopic images.

FIG. 1 shows a schematic of an illustrative embodiment of the 3D device of this application. Referring to FIG. 1, a 3D device 1 according to one embodiment may include a displaying part 101 and a filtering part 102. The displaying part 101 may include a light source 1011, a polarizing plate 1012 and an image-generating region 1013. The RS and LS regions may be included in the image-generating region 1013, and the polarizing plate 1012 and the light source 1011 may be included sequentially from one side of the image-generating region 1013.

As the light source 1011, for example, a direct-type or an edge-type backlight unit, which is generally used as a light source in a display device such as a LCD (Liquid Crystal Display) may be used. As the light source 1011, various kinds of devices other than the above may be used.

In the displaying part 101, the polarizing plate 1012 may be positioned between the light source 1011 and the image-generating region 1013. By the above arrangement, lights emitted from the light source 1011 may go through the polarizing plate 1012 and then enter into the image-generating region 1013. The polarizing plate may be an optical device in which a light transmission axis and a light absorption axis that is perpendicular to the light transmission axis formed. If lights enter into the polarizing plate, only lights having polarization axes parallel to the light transmission axis of polarizing plate among the incident lights may go through the polarizing plate. In this specification, in order to distinguish from the polarizing plate included in the filtering part as described below, the polarizing plate included in the displaying part is referred to as a "first polarizing plate," and the polarizing plate included in the filtering part is referred to as a "second polarizing plate."

The image-generating region 1013 may include the LS region configured to generate the L signal in a driving state, and the RS region configured to generate the R signal in a driving state.

In one embodiment, the image-generating region 1013 may be a region formed by a transmissive liquid crystal panel, which includes a liquid crystal layer interposed between two substrates, or a region formed inside of the liquid crystal panel. The liquid crystal panel may, for example, include a first substrate, a pixel electrode, a first alignment layer, a liquid crystal layer, a second alignment layer, a common electrode and a second substrate, which are sequentially arranged from the light source 1011. For example, as a drive element electrically connected to a transparent pixel electrode, an active drive circuit including a thin film transistor (TFT) and wires may be formed on the first substrate. The pixel electrode may, for example, include metal oxides such as indium tin oxide (ITO) and function as an electrode in each pixel. Also, the first and the second alignment layers may function, for example, to align the liquid crystals of the liquid crystal layer. The liquid crystal layer may include, for example, vertical alignment (VA), twisted nematic (TN), super-twisted nematic (STN) or in-plane switching (IPS) mode liquid crystals. The liquid crystal layer may have a function of passing lights from the light source 1011 through each pixel or intercepting the lights by each pixel according to a voltage applied from the drive circuit. For example, the common electrode may function as a common counter electrode.

In the image-generating region 1013, LS and RS regions, which are configured to generate L or R signal in a driving state, and which include at least one pixel, may be formed. For example, at least one unit pixel including liquid crystals encapsulated between the first and second alignment layers in the liquid crystal panel may form the LS or RS region. The LS and RS regions may be arranged in row and/or column directions.

FIGS. 2 and 3 show illustrative arrangements of the RS and LS regions. The illustrative arrangements shown in FIGS. 2 and 3 may be arrangements of the RS and LS regions in case where the front side of the 3D device is observed. In one embodiment, as shown in FIG. 2, the RS and LS regions may have stripe shapes extending in a common direction, for example, a lengthwise direction, and be alternately arranged adjacent to each other. In other embodiment, as shown in FIG. 3, the RS and LS regions may be alternately arranged adjacent to each other in a lattice pattern. However, the arrangement of the RS and LS regions is not limited to the arrangements shown in FIGS. 2 and 3, and a variety of designs may be applicable.

The displaying part 101 may generate signals including the R and L signals, for example, by driving pixels of respective regions according to signals in a driving state.

For example, referring to FIG. 1, if lights emitted from the light source 1011 enter into the first polarizing plate 1012, only lights which are polarized to be parallel to the light transmission axis of the polarizing plate 1012 can go through. The lights which have gone through the polarizing plate 1012 enter into the image-generating region 1013. The lights which enter into the image-generating region 1013 and go through the RS region may become the R signal, and the lights which enter into the image-generating region 1013 and go through the LS region may become the L signal.

The displaying part 101 may include the TC1 region. The TC1 region may be positioned to be adjacent to the RS and LS regions. In FIG. 1 showing a schematic of an illustrative embodiment of the device 1, the TC1 regions are positioned on the front side of the plane on which the RS and LS regions are formed in the image-generating region 1013, and also positioned to be overlapped with parts of the RS and LS regions between the RS and LS regions when the front side of the device is observed. However, the position of the TC1 regions is not limited to the arrangement in FIG. 1. For example, the TC1 regions may be positioned on the back side of the plane on which the RS and LS regions are formed, or, for example, as shown in FIGS. 10 to 14 below, the TC1 regions may be positioned on the same plane on which the RS and LS regions are formed. FIG. 4 shows a schematic of an illustrative arrangement of the LS and RS regions in FIG. 2 considering the presence of the TC1 regions, and FIG. 5 shows a schematic of an illustrative arrangement of the LS and RS regions in FIG. 3 considering the presence of the TC1 regions. In FIGS. 4 and 5, the TC1 regions are represented by diagonal lines.

For example, the TC1 region in combination with the TC2 region may make it possible for the 3D device to display an image in wide viewing angles without losses of the brightness.

In one embodiment, the TC1 region may be a black matrix. For example, in case where the image-generating region 1013 is a region formed by or inside of the transmissive liquid crystal panel, the TC1 region may be a black matrix included in a color filter which is generally presented in the second substrate that is conventionally included in the liquid crystal panel as described above. In one embodiment, TC1 region may be a region including chromium (Cr), a double layer (a double layer of Cr/CrOx) of chromium and chromium oxide, a resin layer including a pigment such as carbon pigment, carbon black or graphite. A method for forming the TC1 region by using the above materials is not particularly limited. For example, the TC1 region may be formed by photolithography or lift off method which is a conventional method for forming a black matrix.

In the 3D device, the filtering part 102 may, for example, include a polarization state-controlling region 1022, and may further include the second polarizing plate 1021. The second polarizing plate 1021 may be included between the displaying part 101 and the polarization state-controlling region 1022. The polarization state-controlling region 1022 may include the LG and RG regions. Also, the TC2 region may be positioned to be adjacent to the LG and RG regions. In FIG. 1 showing a schematic of an illustrative embodiment of the device 1, TC2 region is positioned between the RG and LG regions, and on the front side of the plane on which the RG and LG regions are positioned so as to be overlapped with parts of the RG and LG regions. However, the position of the TC2 regions is not limited to the arrangements in FIG. 1. For example, the TC2 regions may be positioned on the same plane on which the RG and LG regions are presented as shown in FIGS. 10 to 14, or on the back side of the plane. By the above, signals emitted from the image-generating region 1013 can go through the second polarizing plate 1021 and the polarization state-controlling region 1022 sequentially and then be transferred to an observer. Also, when being observed in at least one angle falling within the viewing angles, at least a part of the L and/or R signal can enter into the TC2 region before entering into the LG and/or RG regions, in the process of penetrating the LG and/or RG region or after penetrating the LG and/or RG regions.

As the first polarizing plate 1012, the second polarizing plate 1021 may be an optical device in which a light transmission axis and a light absorption axis that is perpendicular to the light transmission axis formed. If lights enter into the second polarizing plate 1021, only lights having a polarization axis parallel to the light transmission axis of polarizing plate among the incident lights may go through the polarizing plate. In one embodiment, the first and second polarizing plates 1012 and 1021 included in the 3D device 1 may be arranged so that the light absorption axes of the first and second polarizing plates 1012 and 1021 may be perpendicular to each other. The light transmission axes of the first and second polarizing plates 1012 and 1021 may also be perpendicular to each other. In the above, the term "being perpendicular to each other" may mean "being substantially perpendicular to each other," and may include an error within ±15 degrees, ±10 degrees or ±5 degrees.

The RG and LG regions included in the polarization state-controlling region 1022 may be regions configured to control the polarization states of the R and L signals, respectively. In one embodiment, the RG and LG regions may be regions, by which the R and L signals can be emitted from the 3D device under the condition where they have different polarization states from each other.

In one embodiment, in order for the R signal generated and transferred from the RS region in a driving state to be entered into, the RG region may have a size corresponding approximatively to a size of the RS region and be in a position corresponding approximatively to a position of the RS region, and in order for the L signal generated and transferred from the LS region to be entered into, the LG region may have a size corresponding approximatively to a size of the LS region and be in a position corresponding approximatively to a position of the LS region. The RG or LG region having a size corresponding approximatively to a size of the RS or LS region and being in a position corresponding approximatively to a position of the RS or LS region may mean that the RG and LG region should have a size and a position enough for the R and L signals generated from the RS and LS regions respectively to be entered into the RS and LS region respectively, and don't mean that the RG or LG region has the same size and position as the RS or LS region.

In one embodiment, corresponding to the arrangement of the RS and LS regions in the displaying part, the RG and LG regions may be formed to have stripe shapes extending in a common direction, for example, a lengthwise direction, and be alternately arranged adjacent to each other, or may be alternately arranged adjacent to each other in a lattice pattern. For example, in case where the RS and LS regions are arranged as in FIG. 2, the RG and LG regions may be arranged as in FIG. 6, or in case where the RS and LS regions are arranged as in FIG. 3, the RG and LG regions may be arranged as in FIG. 7.

In one embodiment, the R and L signals which have gone through the RG and LG regions respectively may be linearly polarized signals of which polarized direction are substantially perpendicular to each other. In another embodiment, one signal among the R and L signals which have gone through the RG and LG regions respectively may be a left-circularly polarized signal, and the other signal may be a right-circularly polarized signal. For the above, at least one region among the LG and RG regions may include a retardation layer.

For example, the case where the left-circularly and right circularly polarized signals can be generated may include the case where both of the RG and LG regions include the retardation layers and the retardation layers included in the RG and LG regions are $\lambda/4$ wavelength layers. In order to form circularly polarized lights of which rotating directions are opposite to each other, an optical axis of the $\lambda/4$ wavelength layer disposed in the RG region may have a different direction from that of an optical axis of the $\lambda/4$ wavelength layer disposed in the LG region. In one embodiment, the RG region may include a $\lambda/4$ wavelength layer having an optical axis formed in a first direction, and the LG region may include a $\lambda/4$ wavelength layer having an optical axis formed in a second direction which is different from the first direction. The term "n$\lambda$ wavelength layer" as used herein may refer to a phase retardation device capable of phase-retarding incident light by n times of its wavelength, and the "n" may be, for example, ½, ¼ or ¾. Also, the term "optical axis" as used herein may refer to a fast axis or a slow axis when incident light passes through a corresponding region, and may, for example, be the slow axis.

The embodiment of the RG and LG regions is not limited to the above. For example, the right-circularly and the left-circularly polarized lights may also be generated in case where one region among the RG and LG regions includes a $3\lambda/4$ wavelength layer and the other region includes a $\lambda/4$ wavelength layer.

In another embodiment, one region among the RG and LG regions may be a $\lambda/2$ wavelength layer and the other region may be an optically isotropic region. In this case, R and L signals that have gone through the RG and LG regions respectively may be emitted from the 3D device in the form of linearly polarized lights having polarized axes substantially perpendicular to each other.

A polarization state-controlling region according to one embodiment may further include a substrate. In this case, the retardation layer such as λ/4, 3λ/4 or λ/2 wavelength layer or the optically isotropic region may be formed on the substrate. Such polarization state-controlling region may be included in the device under the state where the retardation layer is disposed toward the displaying part and the substrate is disposed toward an observer.

As the substrate layer, for example, a glass substrate or a plastic substrate which is conventionally used for preparing an optical device may be used.

Examples of the plastic substrate may include a substrate of a cellulose such as a triacetyl cellulose (TAC) or a diacetyl cellulose (DAC); a substrate of a cycloolefin polymer (COP) such as a norbornene derivative; a substrate of an acrylic resin such as a poly(methyl methacrylate) (PMMA); a substrate of a polycarbonate (PC); a substrate of a polyolefin such as a polyethylene (PE) or a polypropylene (PP); a substrate of a polyvinyl alcohol (PVA); a substrate of a poly(ether sulfone) (PES); a substrate of a poly(etheretherketone) (PEEK); a substrate of a polyetherimide (PEI); a substrate of a poly(ethylene naphthalate) (PEN); a substrate of a polyester such as a poly(ethylene terephthalate) (PET); a substrate of a polyimide (PI); a substrate of a polysulfone (PSF); or a substrate of a fluororesin such as an amorphous fluororesin. In one embodiment, a substrate of a cellulose such as a TAC substrate may be used.

The substrate may have a monolayer or a multilayer structure. Viewed from the side providing a thinner device, the monolayer structure may be applied. A thickness of the substrate is not particularly limited, and it may be appropriately controlled considering a predetermined application.

In one embodiment, the retardation layer formed on the substrate may include an alignment layer formed on the substrate and a liquid crystal layer formed on the alignment layer. The liquid crystal layer may be, for example, the λ/4, 3λ/4 or λ/2 wavelength layer, and the alignment layer under the liquid crystal layer may be a layer controlling an optical axis of the wavelength layer. As the alignment layer, conventional alignment layers known in the field may be used. For example, a photo-alignment layer, of which an alignment may be determined by dimerization, fries rearrangement or cis-trans isomerization reaction induced by an irradiation with a linearly polarized light, and which then can induce an alignment in a liquid crystal layer adjacent thereto by the determined alignment, a polymer layer such as a rubbed polyimide layer, an alignment layer formed by an imprinting method such as a nanoimprinting method or a resin layer in which a plurality of patterned grooves are formed may be exemplified.

The liquid crystal layer may be, for example, a photo-polymerized or photo-crosslinked layer of a photo-polymerizable or photo-crosslinkable liquid crystal compound. In this field, various liquid crystal compounds capable of showing the above properties are known, and examples thereof may include RM (Reactive Mesogen) available from Merk Co. and LC242 available from BASF Co.

A method for preparing the polarization state-controlling region is not particularly limited. In this field, various methods for preparing the polarization state-controlling region are known, any known methods may be used.

The filtering part may include TC2 regions positioned to be adjacent to the RG and LG regions. FIG. 8 shows a schematic of an illustrative arrangement of the LG and RG regions in FIG. 6 considering the presence of the TC2 regions, and FIG. 9 shows a schematic of an illustrative arrangement of the LG and RG regions in FIG. 7 considering the presence of the TC2 regions. In FIGS. 8 and 9, the TC2 regions are represented by diagonal lines.

In the filtering part, TC2 regions may be formed in appropriate positions according to the need.

In one embodiment, the TC2 region may be positioned between the polarization state-controlling region and the second polarizing plate of the filtering part. Under such state, when the front side of the device is observed, the TC2 region may be positioned to be overlapped with at least a part of the RG or LG region or at least parts of the RG and LG regions. FIG. 10 shows a schematic of an illustrative embodiment of a 3D device 10, in which the TC2 region is positioned to be overlapped with at least parts of the RG and LG regions. As shown in FIG. 10, the TC2 region may be positioned to come in contact with the side facing a polarization state-controlling region 1022 of a second polarizing plate 1021 or the side facing the second polarizing plate 1021 of the polarization state-controlling region 1022, and be positioned to be overlapped with at least a part of the RG and/or LG region.

In another embodiment, the TC2 region may be positioned between the image-generating region of the displaying part and the second polarizing plate of the filtering part. Under such state, when the front side of the device is observed, the TC2 region may be positioned to be overlapped with at least a part of the RG or LG region or at least parts of the RG and LG regions. FIG. 11 shows a schematic of an illustrative embodiment of a 3D device 11, in which the TC2 region is positioned between the second polarizing plate of the filtering part and the image-generating region of the displaying part. As shown in FIG. 11, the TC2 region may be positioned, for example, to come in contact with the side, opposite to the side coming in contact with the polarization state-controlling region 1022, of the second polarizing plate 1021 or, although not being shown in FIG. 11, for example, to come in contact with the side of the displaying part, for example, the side facing the second polarizing plate 1021 of the image-generating region 1013, and be positioned to be overlapped with at least a part of the RG and/or LG region.

In still another embodiment, the TC2 region may be positioned in the side, opposite to the displaying part, of the polarization state-controlling region. Under such state, when the front side of the device is observed, the TC2 region may be positioned to be overlapped with at least a part of the RG or LG region or at least parts of the RG and LG regions. FIG. 12 shows a schematic of an illustrative embodiment of a 3D device 12, in which the TC2 region is positioned in the side, opposite to the displaying part, of the polarization state-controlling region. As shown in FIG. 12, the TC2 region may be positioned, for example, to come in contact with the side, opposite to the side coming in contact with the second polarizing plate 1021, of the polarization state-controlling region 1022 and be positioned to be overlapped with at least a part of the RG and/or LG region.

The TC2 region may be formed by using a light-blocking ink or a light-absorbing ink. For example, the TC2 region may be formed by a method printing the light-blocking ink or light-absorbing ink according to a predetermined position, pattern or shape of the TC2 region. For example, in order to form the TC2 region in the position as shown in FIG. 10, the TC2 region may be formed by printing the ink on one side of the second polarizing plate 1021 or the polarization state-controlling region 1022 according to a predetermined shape and pattern. Also, in order to form the TC2 region in the position as shown in FIG. 11, the TC2 region may be formed by printing the ink on one side of the second polarizing plate 1021 or the image-generating region 1013. In one embodiment, in case where the image-generating region is the liquid crystal panel, according to a predetermined shape and pattern, the TC2 region may be formed by printing the ink on the second substrate which may be included in the liquid crystal panel as described above. Also, in order to form the TC2 region in the position as shown in FIG. 12, according to a predetermined shape and pattern, TC2 region may be formed by printing on one side of the polarization state-controlling region 1022, for example, on the side of the substrate, i.e., the substrate on which the retardation layer such as λ/4, 3λ/4 or λ/2 wavelength layer or the optically isotropic region is formed as described above. The ink may be printed on the substrate's side on which the retardation layer such as λ/4, 3λ/4 or λ/2 wavelength layer or the optically isotropic region is not formed.

As the ink, for example, light-blocking or light-absorbing inks known in the art may be used without limitation. Examples of such inks may include inks including organic pigments such as azo-based pigments or phthalocyanine pigments or inorganic pigments such as carbon black, graphite or iron oxides. The ink may be used in the printing process after being mixed with an appropriate binder and/or solvent. In one embodiment, the light transmittance of the TC2 region may be adjusted by controlling the kinds or mixing amounts of the pigments.

The printing method is not particularly limited, but, for example, printing methods such as screen printings or gravure printings, or selective jetting such as ink-jet printings may be applied.

A 3D device according to one embodiment may include the TC1 and TC2 regions, and therefore may display stereoscopic images in wider viewing angles without losses of the brightness.

In one embodiment, the TC1 and TC2 regions may satisfy the following Formula 1. In the range satisfying the following Formula 1, the brightness of the 3D device may be appropriately obtained and wide viewing angles may be displayed.

$$H_1 + H_2 \leq (P_L + P_R)/2 \quad \text{[Formula 1]}$$

In Formula 1, $H_1$ is the width of the TC1 region, $H_2$ is the width of the TC2 region, $P_L$ is the width of the LG region and $P_R$ is the width of the RG region.

FIG. 13 shows a schematic of an illustrative embodiment of the case where only the image-generating region 1013 and the filtering part 102 including the second polarizing plate 1021 and the polarization state-controlling region 1022 of the 3D device are observed from the side. In FIG. 13, the "$H_1$," "$H_2$," "$P_L$" and "$P_R$" are expressed, respectively.

In the 3D device, specific ranges of the "$H_1$" and "$H_2$" may be appropriately selected considering the ranges satisfying the Formula 1 according to concrete specifications of the 3D device, and specific values thereof are not particularly limited. In one embodiment, the "$H_2$" may be, for example, more than 0 μm and also not more than 1,000 μm. The lowest limit of the "$H_2$" may be, for example, 20 μm, 25 μm, 30 μm, 35 μm, 40 μm, 45 μm, 50 μm, 55 μm, 60 μm, 65 μm, 70 μm, 75 μm or 80 μm. Also, the upper limit of the "$H_2$" may be, for example, 900 μm, 800 μm, 700 μm, 600 μm, 500 μm, 400 μm, 300 μm, 290 μm, 280 μm, 270 μm, 260 μm, 250 μm, 240 μm, 230 μm, 220 μm, 210 μm or 200 μm. The range of the "$H_2$" may be defined by selecting and combining the above lowest limits and upper limits respectively.

Also, the "$H_1$" may be selected so as for the sum of the "$H_1$" and "$H_2$" to be more than 0 μm and also not more than 2,000 μm. The lowest limit of the sum of the "$H_1$" and "$H_2$" may be, for example, 40 μm, 50 μm, 60 μm, 70 μm, 80 μm, 90 μm, 100 μm, 110 μm, 120 μm, 130 μm, 140 μm, 150 μm or 160 μm. Also, the upper limit of the sum of the "$H_1$" and "$H_2$" may be, for example, 1900 μm, 1800 μm, 1700 μm, 1600 μm, 1500 μm, 1400 μm, 1300 μm, 1200 μm, 1100 μm, 1000 μm, 900 μm, 800 μm, 700 μm, 600 μm, 500 μm, 400 μm or 300 μm. The range of the sum of the "$H_1$" and "$H_2$" may be defined by selecting and combining the above lowest limits and upper limits respectively.

Also, in the 3D device, specific ranges of the "$P_L$" and "$P_R$" may be appropriately selected according to concrete specifications of the 3D device, and specific values thereof are not particularly limited. In one embodiment, if the device is a 47 inch device, the specific ranges of the "$P_R$" and "$P_L$" may be, for example, selected to be from 150 μm to 350 μm, respectively. Considering conventional specifications of the device, the specific ranges of the "$P_R$" and "$P_L$" may be, for example, from 150 μm to 1,000 μm, respectively.

In the 3D device, the width "$H_2$" of the TC2 region may be the same as or shorter than the width "$H_1$" of the TC1 region. In one embodiment, the difference ($H_1-H_2$) between the width "$H_1$" of the TC1 region and the width "$H_2$" of the TC2 region may be, for example, within 1,000 μm, within 900 μm, within 800 μm, within 700 μm, within 600 μm, within 500 μm, within 400 μm, within 300 μm, within 175 μm, within 150 μm, within 125 μm, within 100 μm, within 75 μm, within 50 μm or within 25 μm or may be substantially 0 μm. Under the above state, the wide viewing angles of the 3D device may be secured without losses of the brightness.

In one embodiment, in the device, the relative brightness observed from the front side of the display device may be not less than 60%, not less than 65% or not less than 70%. The term "relative brightness" as used herein may refer to a ratio ($I_T/I_O$) of the brightness ($I_T$) of the device in which the TC1 and TC2 regions are formed with respect to the brightness ($I_O$) of the device in which both of the TC1 and TC2 regions are not formed.

Also, in the 3D device, for example, both of the maximum value of the angle $\theta_U$ satisfying the following Formula 2 and the maximum value of the angle $\theta_L$ satisfying the following Formula 3 may be 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

$$\tan \theta_U = (H_1 + 2y)/2T \quad \text{[Formula 2]}$$

$$\tan \theta_L = (H_1 + 2H_2 - 2y)/2T \quad \text{[Formula 3]}.$$

In Formulas 2 and 3, $H_1$ is the width of the TC1 region, $H_2$ is the width of the TC2 region, T is the distance between the displaying part and the filtering part, and y is the distance from the point, at which a hypothetical normal of a line bisecting the width of the TC1 region with respect to the surface of the TC1 region comes in contact with the TC2 region, to the point on which the TC2 region is presented.

The "$\theta_U$" and "$\theta_L$" may, for example, mean the viewing angles of the 3D device, respectively. Referring FIG. 14, the Formulas 2 and 3 are further explained as below.

On the assumption that the term "viewing angles" refer to the ranges of the angles, within which the L signal generated from the image-generating region may go through the LG region and may not go through the RG region, and then be transferred toward an observer, or within which the R signal generated from the image-generating region may go through the RG region and may not go through the LG region, and then be transferred toward an observer, the above viewing angles are expressed as the "$\theta_U$" and "$\theta_L$," respectively, in FIG. 14.

As in FIG. 14, the viewing angles may be determined according to the distance "T" from the image-generating region to the filtering part, and the widths of the TC1 and TC2 regions. In the above, the distance "T" from the image-generating region to the filtering part may refer to, for example, the distance from the image-generating region's side facing the filtering part to the point at which the TC2 region of the filtering part ends. In one embodiment, in case where the image-generating region is the region formed by the liquid crystal panel, the image-generating region's side facing the filtering part may mean the side facing the filtering part of the liquid crystal layer in the liquid crystal panel.

The distance "T" may be determined according to a specification of the 3D device, and is not particularly limited. In one embodiment, the distance "T" may be, for example, 5 mm or less or from about 0.5 mm to 5 mm.

Referring to FIG. 14, it can be seen that, in case where the distance "T" is fixed, the viewing angles "$\theta_U$" and "$\theta_L$" may be determined by the widths $H_1$ and $H_2$, and relative positions of the TC1 and TC2 regions.

That is, referring to FIG. 14, it can be confirmed that the viewing angle "$\theta_U$" may be formed so as for the value of tan $\theta_U$ to become identical to the value of the sum ($H_1/2+y$) of ½ times as long as the width "H1" of the TC1 region and the distance y from the point, at which a hypothetical normal "C" of a line bisecting the width of the TC1 region with respect to the surface of the TC1 region or the image-generating region comes in contact with the TC2 region, to the point on which the TC2 region is presented, divided by the distance "T." Also, it can be confirmed that the viewing angle "$\theta_L$" may be formed so as for the value of tank to become identical to the value of the sum ($H_1/2+H_2-y$) of ½ times as long as the width "$H_1$" of the TC1 region and the width $H_2$ of the TC2 region minus the distance y from the point, at which a hypothetical normal "C" of a line bisecting the TC1 region with respect to the surface of the TC1 region or the image-generating region comes in contact with the TC2 region, to the point on which the TC2 region is presented, divided by the distance "T."

In the 3D device including the TC1 and TC2 regions, when observing stereoscopic images, wide viewing angles along with excellent brightness properties can be secured by controlling the sizes such as the widths and the relative positions of the TC1 and TC2 regions.

A 3D device according to one embodiment may have the relative brightness observed from the front side thereof of 60% or more, 65% or more or 70% or more, and, at the same time, may have the maximum value of the angle "$\theta_U$" satisfying the Formula 2 and the maximum value of the angle "$\theta_L$" satisfying the Formula 3, both of which are 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

This application also relates to a method for preparing a display device, for example, to a method for preparing a 3D device.

In one embodiment, the method may be a method for preparing a display device that includes a displaying part including RS and LS regions; and a filtering part including a polarization state-controlling region including RG and LG regions, for example a method for preparing the display device as described above.

In the above method, the filtering part may be arranged so that R signals generated and transferred from the RS region may enter into the RG region, and L signals generated and transferred from the LS region may enter into the LG region in a driving state.

The method may include positioning TC1 regions to be adjacent to the RS and LS regions. Also, the method may include positioning TC2 regions to be adjacent to the RG and LG regions. In the above, the TC1 and TC2 regions may satisfy, for example, the above Formula 1.

In the method, the positioning of the TC1 region may be, for example, performed so that, in a driving state, at least a part of the generated R and/or L signals may enter into the TC1 region. It may be fine that the incidence to the TC1 region can be accomplished, for example, at any time before signals generated from the displaying part are transferred to the filtering part. Also, it may be fine that the incidence to the TC1 region can be accomplished in at least one angle within the ranges falling within the viewing angles.

Also, in the method, the positioning of the TC2 region may be performed so that at least a part of the R and/or L signals may enter into the TC2 region. The incidence to the TC2 region may be accomplished before the R and/or L signals enter into the RG and/or LG regions, in the process that the R and/or L signals go through the RG and/or LG regions, or after the R and/or L signals go through the RG and/or LG regions. Also, it may be fine that the incidence to the TC2 region can be accomplished in at least one angle within the ranges falling within the viewing angles.

A display device displaying an image such as a stereoscopic image in wide viewing angles without losses of the brightness may be prepared by making a part of R or L signal to enter into the TC1 and TC2 regions in the process that the R or L signal is generated from the displaying part and then goes through the filtering part.

In the above, as specific ranges of the "$H_1$," "$H_2$," "$P_L$" and "$P_R$," the contents as described in the description regarding the display device may be identically applied.

Also, in the method, the positioning of the TC1 and TC2 regions may be, for example, performed so that, when an image displayed from the prepared display device is observed from the front side, the relative brightness may be, for example, 60% or more, 65% or more or 70% or more.

Also, in the method, the positionings of the TC1 and TC2 regions may be, for example, performed so that both of the maximum value of the angle $\theta_U$ satisfying the following Formula 2 and the maximum value of the angle $\theta_L$ satisfying the following Formula 3 in the prepared device may be 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

The relative brightness and viewing angles as described above may be accomplished, for example, by appropriately controlling the sizes such as widths and the relative positions of the TC1 and/or TC2 regions to be positioned.

In one illustrative method, the positionings of the TC1 and TC2 regions may be performed so that, when an image displayed from the prepared display device is observed from the front side, the relative brightness may be, for example, 60% or more, 65% or more or 70% or more, and, at the same time, both of the maximum value of the angle $\theta_U$ satisfying the following Formula 2 and the maximum value of the angle $\theta_L$ satisfying the following Formula 3 may be 3 degrees or more, 5 degrees or more, 8 degrees or more, 8.5 degrees or more, 9 degrees or more, 9.5 degrees or more, 10 degrees or more, 10.5 degrees or more, 11 degrees or more, 11.5 degrees or more, 12 degrees or more, 12.5 degrees or more, 13 degrees or more, 13.5 degrees or more, 14 degrees or more, 14.5 degrees or more, or 15 degrees or more.

BRIEF DESCRIPTION OF THE DRAWINGS

FIGS. 2 and 3 show schematics of illustrative embodiments of the arrangements of LS and RS regions.

FIGS. 6 and 7 show schematics of illustrative embodiments of the arrangements of LG and RG regions.

Figure 1:
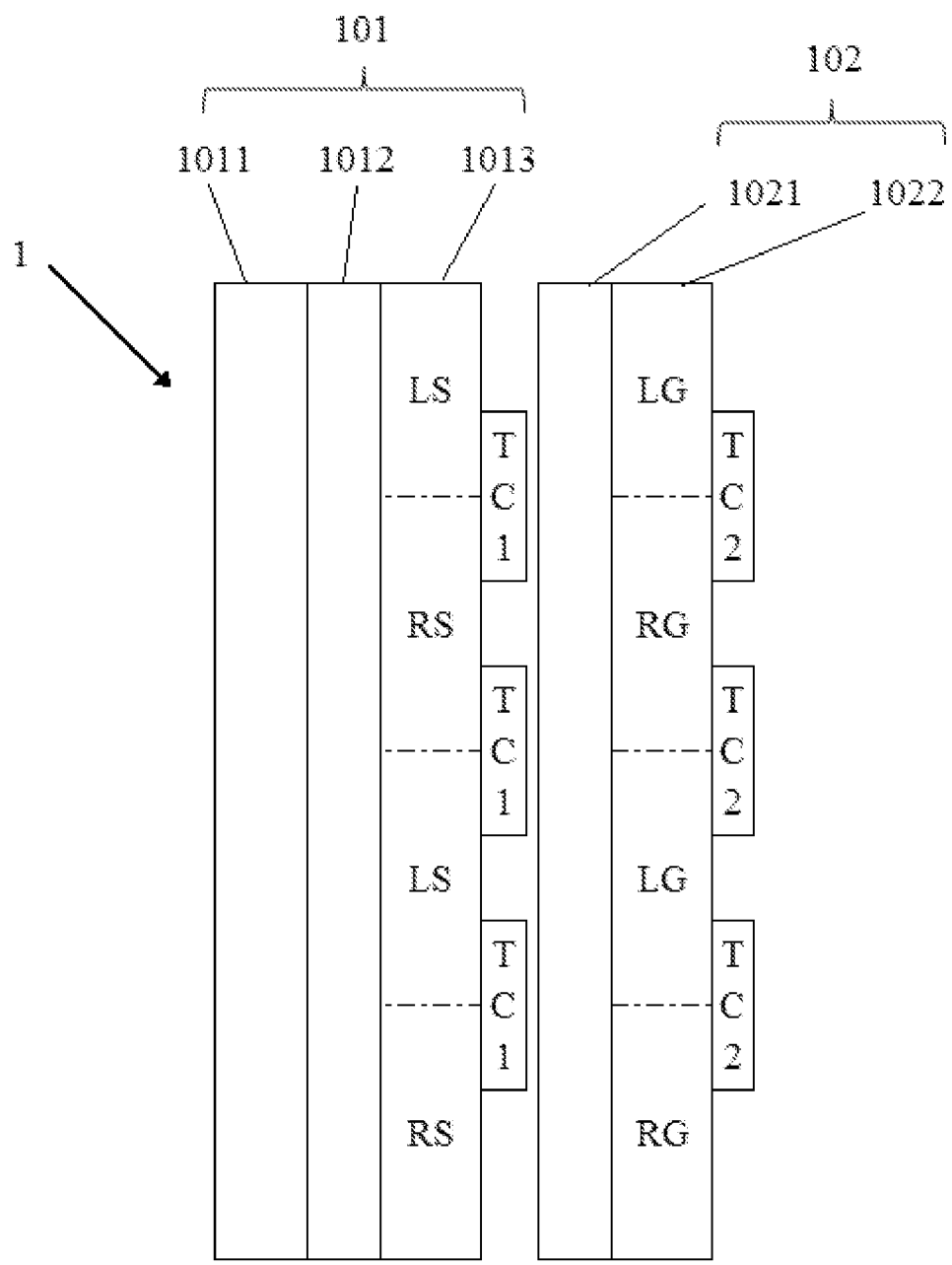
FIG. 1 shows a schematic of an illustrative embodiment of a 3D device.

DESCRIPTIONS OF THE MARKS IN DRAWING 1, 10, 11, 12: a 3D device
1011: a light source
1012: a first polarizing plate
1013: an image-generating region
101: a displaying part
1021: a second polarizing plate
1022: a polarization state-controlling region
LS: a region for generating a signal for a left eye
RS: a region for generating a signal for a right eye
TC1: a first light-penetration-controlling region
LG: a region for controlling the polarization state of a signal for a left eye
RG: a region for controlling the polarization state of a signal for a right eye
TC2: a second light-penetration-controlling region
$H_1$: the width of a first light-penetration-controlling region
$H_2$: the width of a second light-penetration-controlling region
$P_L$: the width of a region for controlling the polarization state of a signal for a left eye
$P_R$: the width of a region for controlling the polarization state of a signal for a right eye
T: a distance from a displaying part to a filtering part
C: a hypothetical normal of a line bisecting the width of a first light-penetration-controlling region with respect to the surface of the first light-penetration-controlling region or an image-generating region
y: a distance from the point, at which the hypothetical normal "C" comes in contact with a second light-penetration-controlling region, to the point on which the second light-penetration-controlling region is presented
$θ_U$, $θ_L$: viewing angles

DETAILED DESCRIPTION OF EXEMPLARY EMBODIMENTS

Hereinafter, embodiments of the optical device will be described in detail. However, the optical device is not limited to the embodiments disclosed below, but can be implemented in various forms.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of embodiments. The term "and/or" includes any and all combinations of one or more of the associated listed items.

The terminology used herein is for the purpose of describing particular embodiments only and is not intended to be limiting of embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, embodiments of the optical device will be described in detail below. To aid in understanding, like numbers refer to like elements throughout the description of the figures, and the description of the same elements will be not reiterated.

Examples 1 to 4

Figure 2:
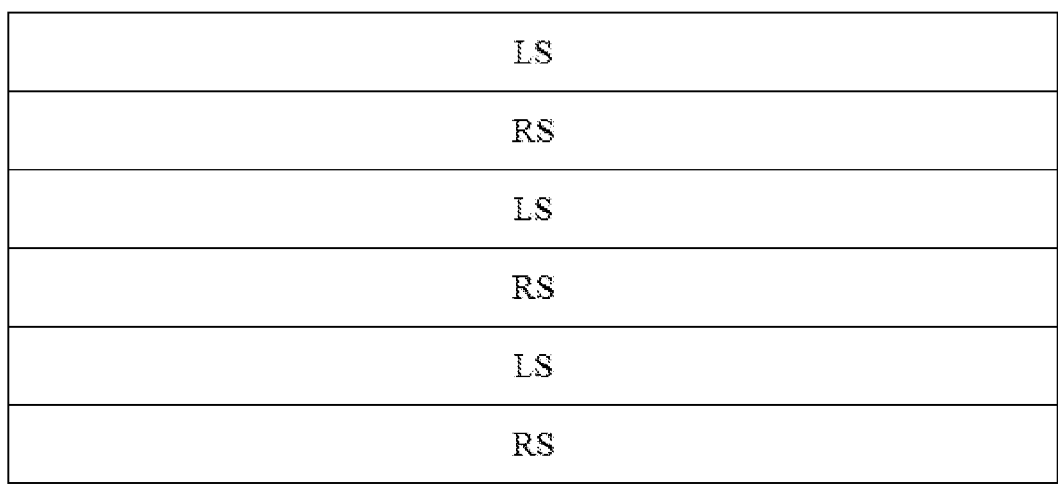
Figure 4:
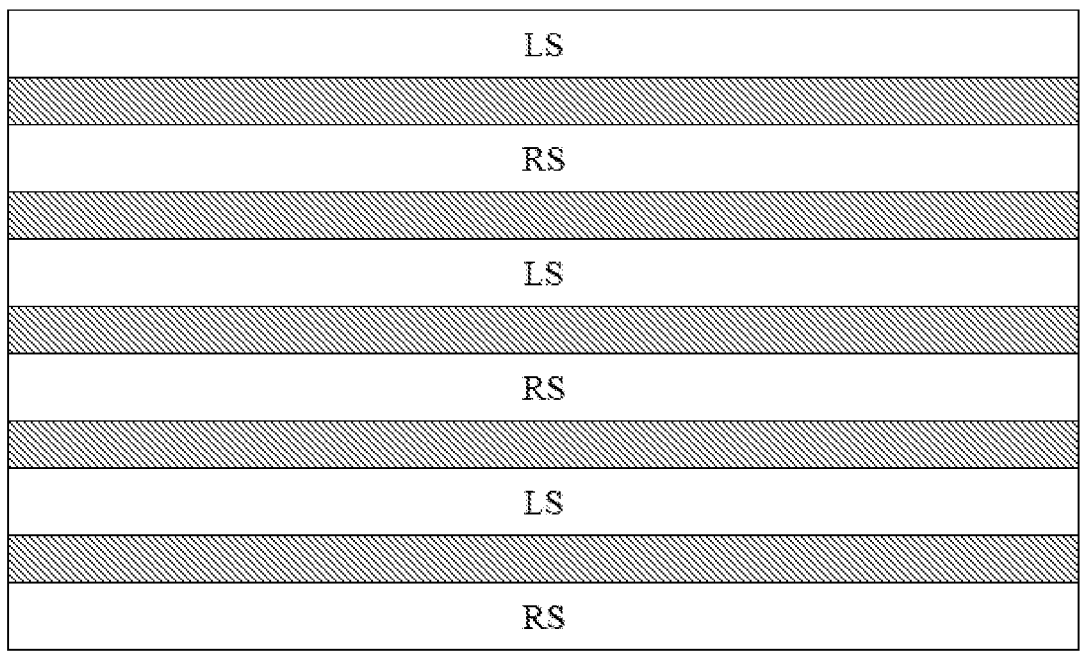
FIGS. 4 and 5 show schematics of illustrative embodiments of the arrangements of LS, RS and TC1 regions.
Figure 5:
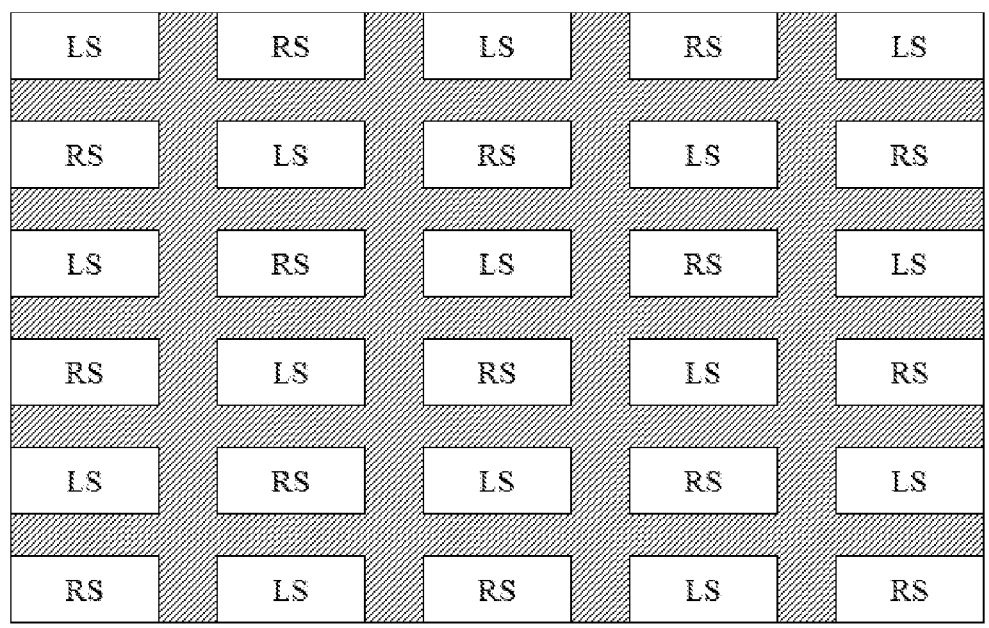
Figure 6:
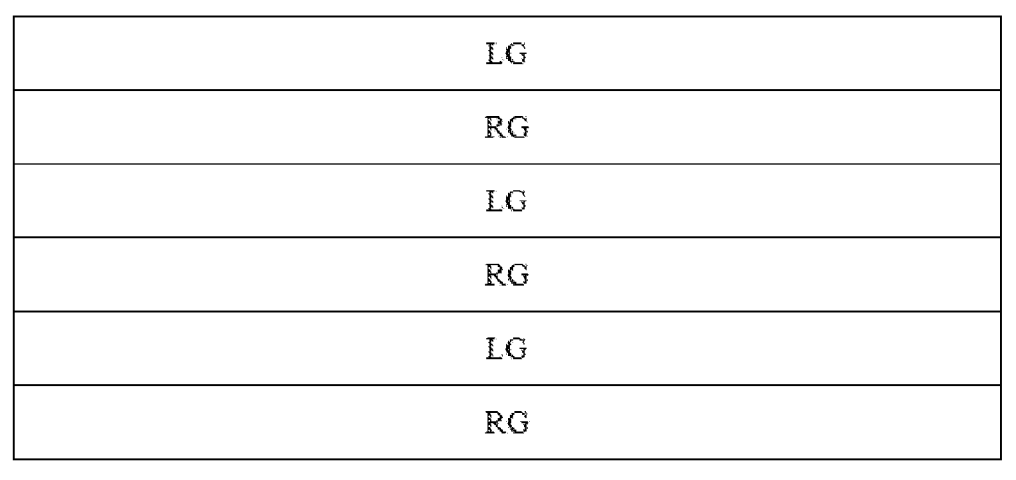
Figure 8:
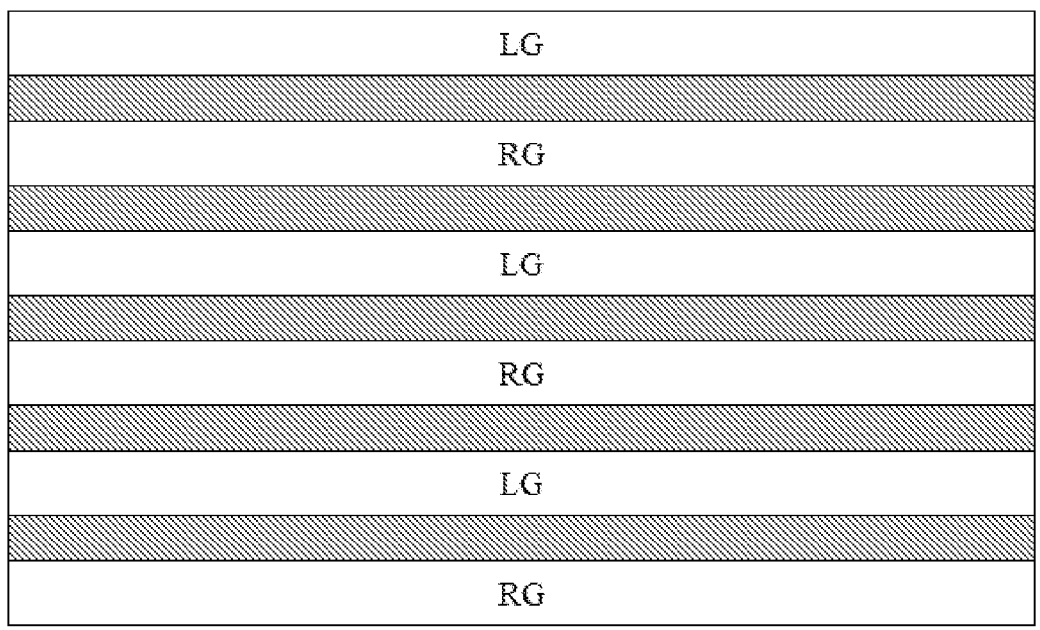
FIGS. 8 and 9 show schematics of illustrative embodiments of the arrangements of LG, RG and TC2 regions.
Figure 9:
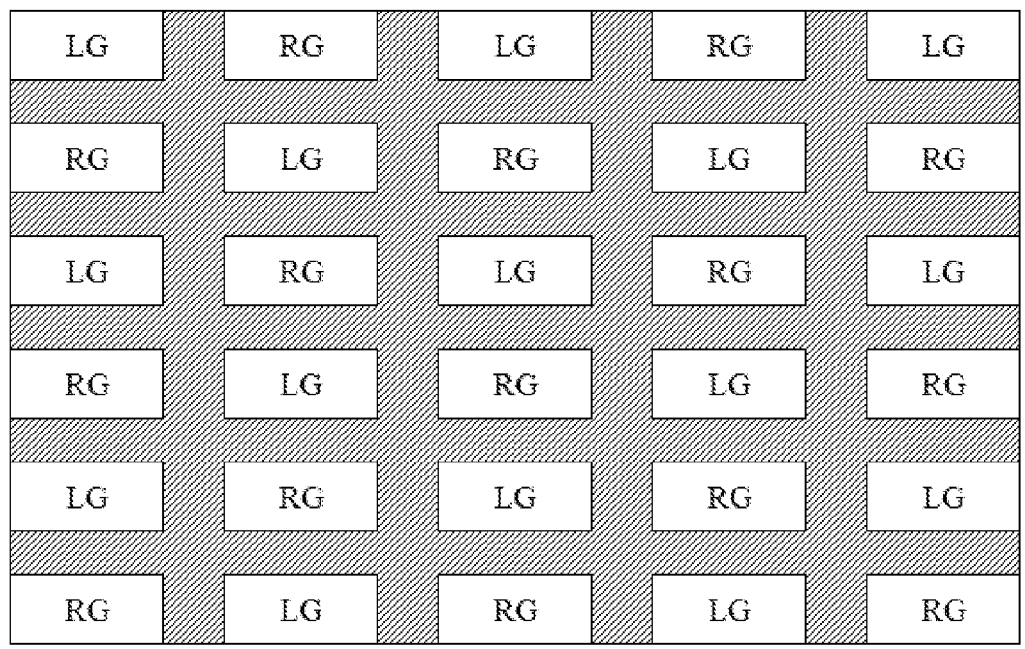
Figure 10:
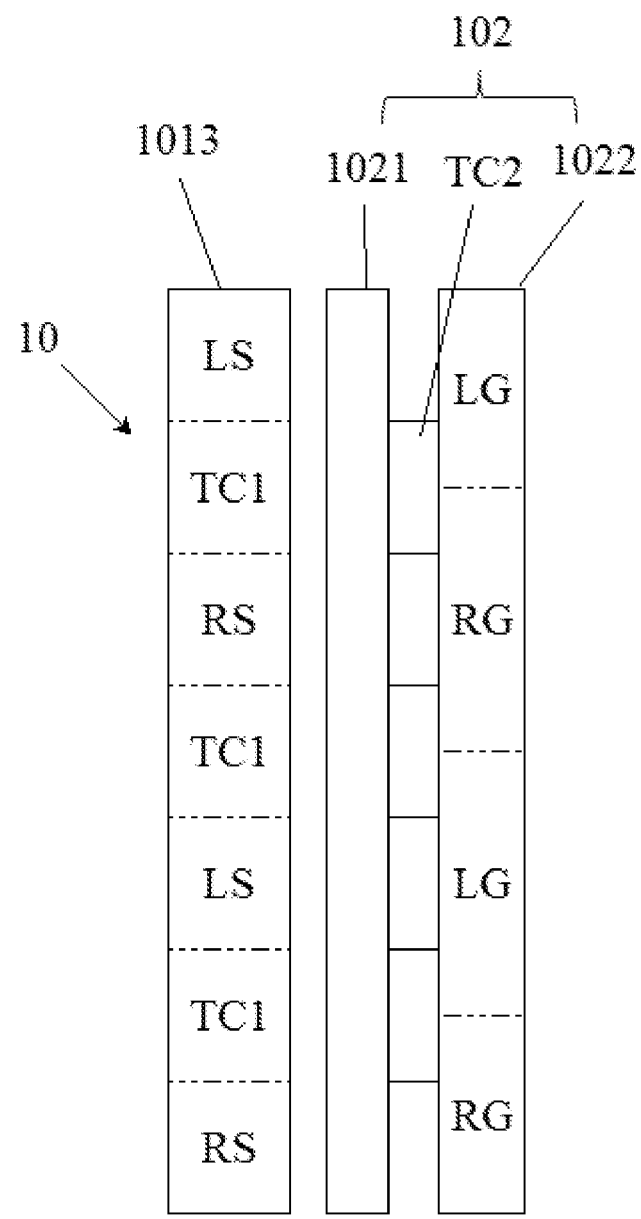
FIGS. 10 to 13 show schematics of illustrative embodiments of 3D devices.
Figure 11:
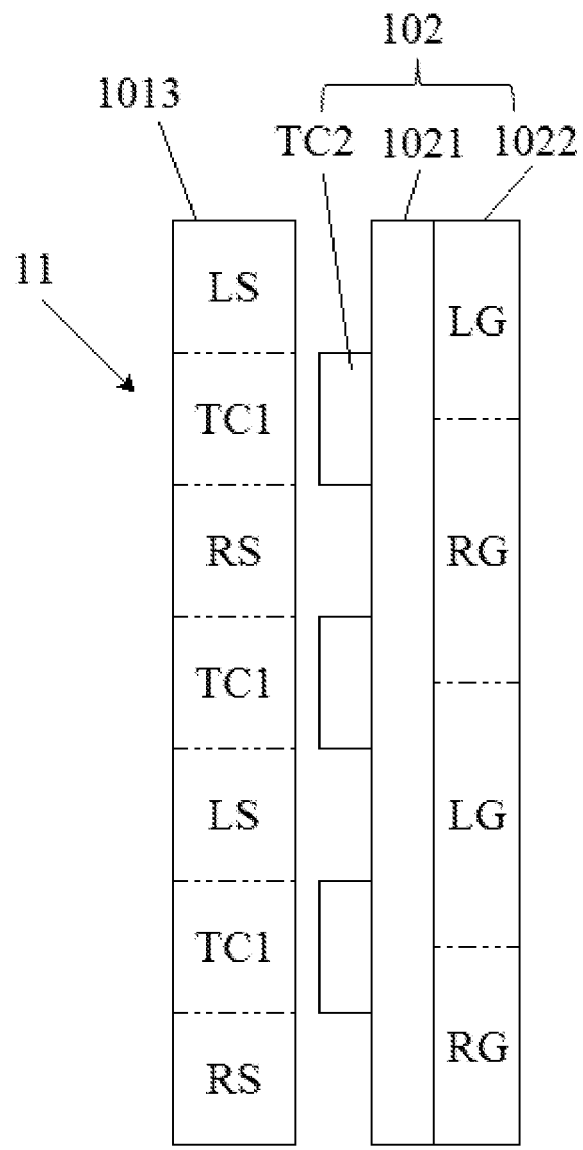
Figure 12:
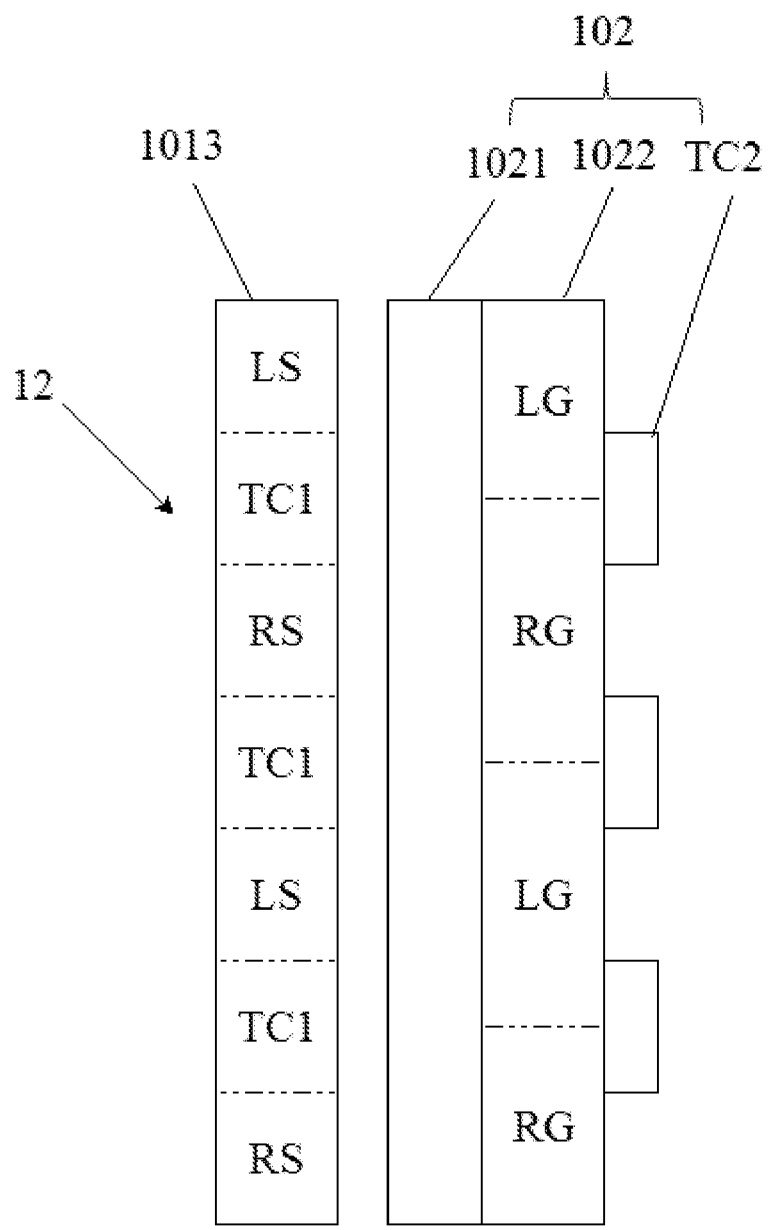
Figure 13:
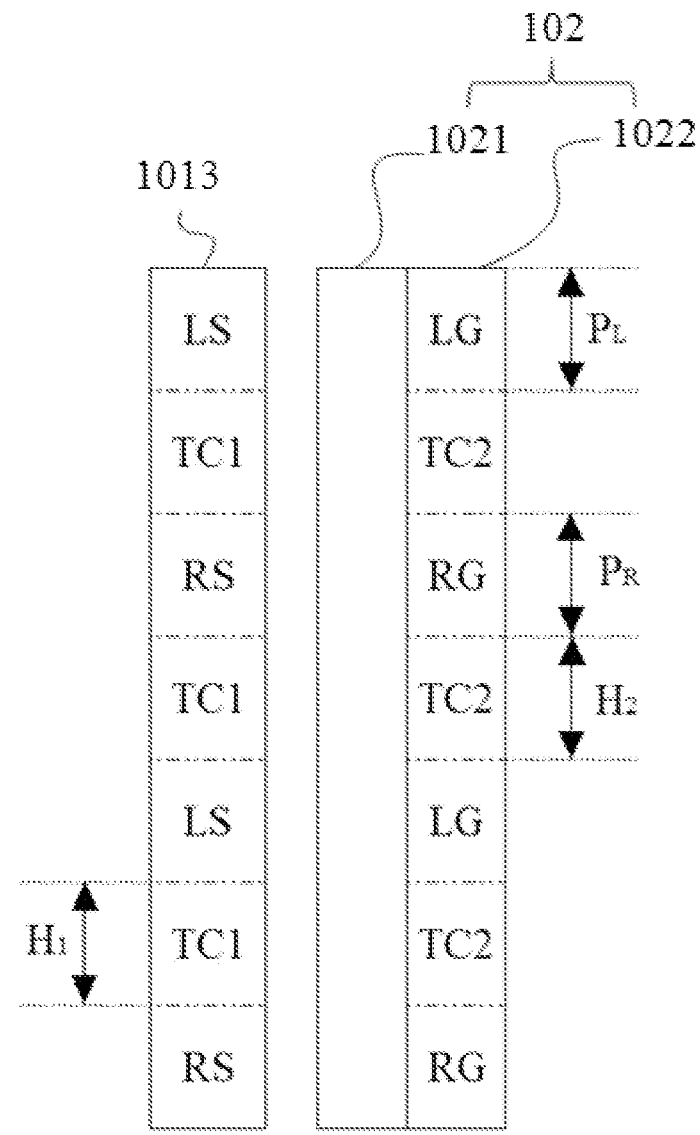
Figure 14:
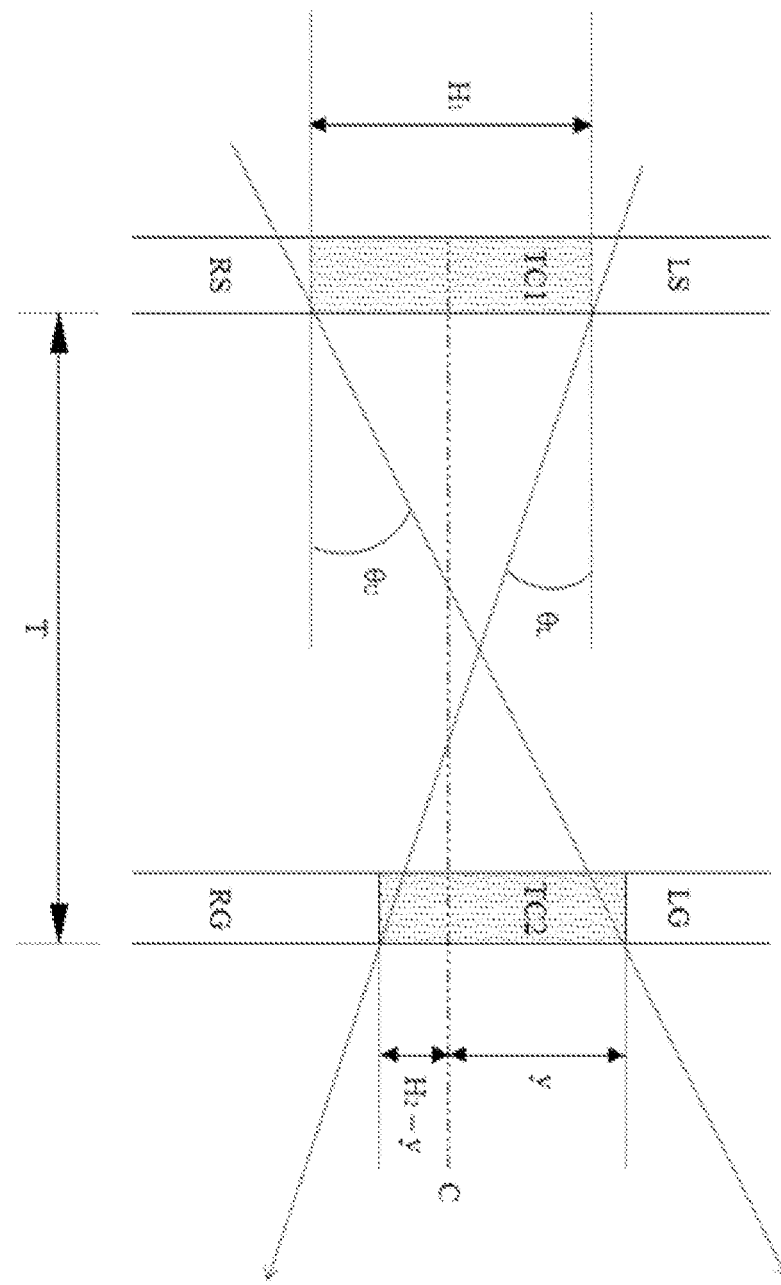
FIG. 14 shows a schematic of an illustrative embodiment of formations of viewing angles in a 3D device.

The device that had the structure as shown in FIG. 1, in which the image-generating region 1013 is a transmissive liquid crystal panel, the RS and LS regions in the panel were arranged as in FIG. 2, the TC1 regions were formed by the black matrix of the color filter in the liquid crystal panel, and the TC1 regions were formed to be positioned between the RS and LS regions, to be positioned as in FIG. 4 and to be overlapped with parts of the RS and LS regions was configured. In the above, TC1 regions were formed so that the size in which the TC1 region and RS region were overlapped was the same as the size in which the TC1 region and LS region were overlapped. Also, in the above device, the RG and LG regions of the polarization state-controlling region 1022 of the filtering part 102 were positioned as in FIG. 6. In the above, the TC2 regions were formed so that they were positioned between the RG and LG regions as in FIG. 8 and overlapped with parts of the RG and LG regions. In the above, the TC2 regions were formed so that the size in which the TC2 region and RG region were overlapped was the same as the size in which the TC2 region and LG region were overlapped. That is, the TC2 region was formed so that "y" became identical to "$H_2/2$," when referring to FIG. 14. In the device, a retardation layer (a λ/4 wavelength layer) having a slow axis forming 45 degrees in an anticlockwise direction with a light absorption axis of the second polarizing plate 1021 was positioned in the RG region, a retardation layer (a λ/4 wavelength layer) having a slow axis forming 45 degrees in a clockwise direction with a light absorption axis of the second polarizing plate 1021 was positioned in the LG region, and the first and second polarizing plates 1012 and 1021 were positioned so that the light absorption axes might be perpendicular to each other. In the device, the distance ("T" in the Formulas 2 and 3) from the displaying part to the filtering part was about 1 mm, the sum ("$P_L+P_R$" in the Formula 1) of the widths of LG and RG regions was about 545 μm, and the width of the LG region was roughly identical to that of the RG region. The above device was driven by controlling the widths $H_1$ and $H_2$ of the TC1 and TC2 regions so as for about 13.5 degrees of the maximum viewing angle $θ_U$ or $θ_L$ to be secured in all examples, but changing the widths $H_1$ and $H_2$ of the TC1 and TC2 regions of respective examples as in Table 1 below, and then the relative brightness according to respective viewing angles ($\theta_U$ or $\theta_L$) was evaluated by using a brightness photometer (apparatus: SR-UL2 Spectrometer). The results are expressed in Table 1.

TABLE 1

|  | Examples | | | |
|---|---|---|---|---|
|  | 1 | 2 | 3 | 4 |
| $H_1$ (unit: μm) | 210 | 180 | 150 | 120 |
| $H_2$ (unit: μm) | 30 | 60 | 90 | 120 |
| $H_1 + H_2$ (unit: μm) | 240 | 240 | 240 | 240 |
| Viewing angles (unit: degrees) | Relative brightness (unit: %) | | | |
| 0 | 61.1 | 66.7 | 72.5 | 78 |
| 2 | 61.1 | 66.7 | 72.5 | 74.8 |
| 4 | 61.1 | 66.7 | 69.3 | 71.6 |
| 6 | 61.1 | 66.7 | 66.1 | 68.4 |
| 8 | 61.1 | 65 | 62.9 | 65.2 |
| 10 | 61.1 | 62.2 | 62 | 61.9 |
| 12 | 58.3 | 59 | 58.8 | 58.7 |
| 13 | 56 | 56 | 56 | 56 |

Comparative Example 1

The device was configured as in Examples 1 to 4, except that the device included only the TC1 regions and did not include the TC2 regions, and the width $H_1$ of the TC1 region was controlled to be 240 μm in order for about 13.5 degrees of the maximum viewing angle $\theta_U$ or $\theta_L$ to be secured as in Examples. The above device was driven, and then the relative brightness according to respective viewing angles ($\theta_U$ or $\theta_L$) was evaluated by using a brightness photometer (apparatus: SR-UL2 Spectrometer). The results are expressed in Table 2

TABLE 2

|  | Comparative Example 1 |
|---|---|
| $H_1$ (unit: μm) | 240 |
| $H_2$ (unit: μm) | 0 |
| $H_1 + H_2$ (unit: μm) | 240 |
| Viewing angles (unit: degrees) | Relative brightness (unit: %) |
| 0 | 56 |
| 2 | 56 |
| 4 | 56 |
| 6 | 56 |
| 8 | 56 |
| 10 | 56 |
| 12 | 56 |
| 13 | 56 |

According to one illustrative display device or method for preparing a display device, for example, a stereoscopic image may be displayed in wide viewing angles without losses of the brightness.

What is claimed is:

1. A display device that satisfies the following Formula 1 and that comprises:
   a displaying part comprising a region for generating a signal for a right eye, configured to generate the signal for the right eye; a region for generating a signal for a left eye, configured to generate the signal for the left eye; and a first light-penetration-controlling region that is adjacent to the regions for generating the signals for the right eye and the left eye; and
   a filtering part comprising a polarization state-controlling region that comprises a region for controlling the polarization state of a signal for a right eye in a position into which the signal for the right eye can enter, and a region for controlling the polarization state of a signal for a left eye in a position into which the signal for the left eye can enter; and a second light-penetration-controlling region that is adjacent to the regions for controlling the polarization states of the signals for the right eye and the left eye:

$$H_1+H_2 \le (P_L+P_R)/2 \quad \text{[Formula 1]}$$

wherein $H_1$ and $H_2$ are the widths of the first and second light-penetration-controlling regions, respectively, and $P_L$ and $P_R$ are the widths of the regions for controlling the polarization states of the signals for the left eye and the right eye, respectively.

2. The display device of claim 1, wherein the light transmittances of the first and second light-penetration-controlling regions are in the range from 0% to 20%, respectively.

3. The display device of claim 1, wherein the displaying part further comprises an image-generating region comprising the regions for generating the signals for the right eye and the left eye, and also comprises a first polarizing plate and a light source that are positioned sequentially from one side of the image-generating region.

4. The display device of claim 1, wherein the first light-penetration-controlling region comprises chromium, a double layer of chromium and chromium oxide, a resin layer comprising a pigment, carbon black or a graphite.

5. The display device of claim 1, further comprising a second polarizing plate positioned between the displaying part and the polarization state-controlling region.

6. The display device of claim 1, wherein the second light-penetration-controlling region is positioned between the regions for controlling the polarization states of the signals for the right eye and the left eye.

7. The display device of claim 5, wherein the second light-penetration-controlling region is positioned between the second polarizing plate and the polarization state-controlling region and also is positioned so as to be overlapped with at least a part of the region for controlling the polarization state of the signal for the right eye or the left eye.

8. The display device of claim 5, wherein the second light-penetration-controlling region is positioned so as to come in contact with the second polarizing plate's side which is an opposite side to the second polarizing plate's side coming in contact with the polarization state-controlling region or the displaying part, and also positioned so as to be overlapped with at least a part of the region for controlling the polarization state of the signal for the right eye or the left eye.

9. The display device of claim 5, wherein the second light-penetration-controlling region is positioned so as to come in contact with the polarization state-controlling region's side which is an opposite side to the polarization state-controlling region's side coming in contact with the second polarizing plate, and also positioned so as to be overlapped with at least a part of the region for controlling the polarization state of the signal for the right eye or the left eye.

10. The display device of claim 1, wherein the second light-penetration-controlling region comprises a light-blocking ink or a light-absorbing ink.

11. The display device of claim 1, wherein the second light-penetration-controlling region has a width in a range of more than 0 μm and also not more than 1,000 μm.

12. The display device of claim 1, wherein the second light-penetration-controlling region has a width that is the same as or is less than that of the first light-penetration-controlling region.

13. The display device of claim 12, wherein the difference between the widths of the first and second light-penetration-controlling regions is not more than 1,000 μm.

14. The display device of claim 1, wherein the relative brightness observed from the front side is not less than 60%, the relative brightness being a ratio ($I_T/I_O$) of the brightness ($I_T$) of the device in which the first and second light-penetration-controlling regions are formed with respect to the brightness ($I_O$) of the device in which both of the first and second light-penetration-controlling regions are not formed.

15. The display device of claim 1, wherein the maximum value of the angle $\theta_U$ satisfying the following Formula 2 and the maximum value of the angle $\theta_L$ satisfying the following Formula 3 are not less than three degrees:

$$\tan \theta_U = (H_1 + 2y)/2T \quad \text{[Formula 2]}$$

$$\tan \theta_L = (H_1 + 2H_2 - 2y)/2T \quad \text{[Formula 3]}.$$

wherein $H_1$ and $H_2$ are the widths of the first and second light-penetration-controlling regions, respectively, T represents the distance from the displaying part to the filtering part, and y represents the distance from the point, at which a hypothetical normal of a line bisecting the width of the first light-penetration-controlling region with respect to the surface of the first light-penetration-controlling region comes in contact with the second light-penetration-controlling region, to the point on which the second light-penetration-controlling region is presented.

16. The display device of claim 15, wherein the distance from the displaying part to the filtering part is 5 mm or less.

17. The display device of claim 15, wherein the relative brightness observed from the front side is not less than 60%, the relative brightness being a ratio ($I_T/I_O$) of the brightness ($I_T$) of the device in which the first and second light-penetration-controlling regions are formed with respect to the brightness ($I_O$) of the device in which both of the first and second light-penetration-controlling regions are not formed.

18. A method for preparing a display device that comprises a displaying part comprising a region for generating a signal for a right eye, configured to generate the signal for the right eye, and a region for generating a signal for a left eye, configured to generate the signal for the left eye; and a filtering part comprising a polarization state-controlling region that comprises a region for controlling the polarization state of a signal for a right eye in a position into which the signal for the right eye can enter and a region for controlling the polarization state of a signal for a left eye in a position into which the signal for the left eye can enter;

wherein the method comprises positioning a first light-penetration-controlling region to be adjacent to the regions for generating the signals for the right eye and the left eye so as for a part of the signal for the right eye or the left eye generated from the region for generating the signal for the right eye or the left eye to enter into the first light-penetration-controlling region in at least one angle falling within the ranges of viewing angle, and positioning a second light-penetration-controlling region to be adjacent to the regions for controlling the polarization states of the signals for the right eye and the left eye so as for the signal for the right eye or the left eye to enter into the second light-penetration-controlling region in at least one angle falling within the ranges of viewing angle before the signal for the right eye or the left eye enters into the region for controlling the polarization state of the signal for the right eye or the left eye, in the process that the signal for the right eye or the left eye penetrates the region for controlling the polarization state of the signal for the right eye or the left eye or after the signal for the right eye or the left eye penetrates the region for controlling the polarization state of the signal for the right eye or the left eye, and wherein the first and second light-penetration-controlling regions satisfy the following Formula 1:

$$H_1 + H_2 \le (P_L + P_R)/2 \quad \text{[Formula 1]}$$

wherein $H_1$ and $H_2$ are the widths of the first and second light-penetration-controlling regions, respectively, and $P_L$ and $P_R$ are the widths of the regions for controlling the polarization states of the signals for the left eye and the right eye, respectively.

* * * * *